United States Patent [19]

Ota

[11] Patent Number: 5,144,470
[45] Date of Patent: Sep. 1, 1992

[54] LASER SCANNER DRIVING APPARATUS

[75] Inventor: Kazuo Ota, Hiratsuka, Japan

[73] Assignee: Kabushiki Kaisha Komatsu Seisakusho, Tokyo, Japan

[21] Appl. No.: 768,712

[22] PCT Filed: Apr. 5, 1990

[86] PCT No.: PCT/JP90/00461
§ 371 Date: Oct. 25, 1991
§ 102(e) Date: Oct. 25, 1991

[87] PCT Pub. No.: WO90/13842
PCT Pub. Date: Nov. 15, 1990

[30] Foreign Application Priority Data

Apr. 28, 1989 [JP] Japan .................. 1-110025

[51] Int. Cl.$^5$ .................................. G02B 26/10
[52] U.S. Cl. ................... 359/224; 359/214; 359/226
[58] Field of Search ............ 359/213, 214, 220, 223, 359/224, 225, 226, 872, 873; 250/230, 234, 235

[56] References Cited

U.S. PATENT DOCUMENTS 4,090,781 5/1978 Godot et al. .................. 359/226
4,778,233 10/1988 Christenson et al. .......... 359/223
4,832,425 5/1989 Walther et al. ................. 359/220

FOREIGN PATENT DOCUMENTS 53-131286 10/1978 Japan .
61-132919 6/1986 Japan .
61-134726 6/1986 Japan .
1-243013 9/1989 Japan .

*Primary Examiner*—Loha Ben
*Attorney, Agent, or Firm*—Richards, Medlock & Andrews

[57] ABSTRACT

A laser scanner driving device has a piezoelectric actuator which acts through a lever to rotate a drive shaft against the force of a plunger which is biased by a reaction spring. The drive shaft is the input to a displacement amplifier. A laser beam deflecting mirror is mounted on the output shaft of the displacement amplifier. In order to reduce the effect of friction on the conversion of the rectilinear displacement of the piezoelectric actuator into the rotational displacement of the mirror and to avoid non-coaxial reaction forces on the piezoelectric actuator, at least one rotatable contactor is provided between the free end of the piezoelectric actuator and the lever and at least one rotatable contactor is provided between one end of the plunger and the lever.

20 Claims, 2 Drawing Sheets

LASER SCANNER DRIVING APPARATUS

TECHNICAL FIELD

The present invention broadly relates to a turning type scanner for a laser beam machine, in which a turning deflecting mirror deflects a laser beam for positioning the laser beam, particularly to improvements in a laser scanner driving apparatus employing a piezoelectric actuator as a driving power source for turning the mirror.

BACKGROUND ART

A conventional driving apparatus of a laser scanner is designed as shown in FIGS. 2 to 4, which comprises a mirror 1, a differential speed increaser 2 as a displacement amplifying means, a lever 4 fixed on a shaft 3, a laminate type piezoelectric actuator 5 and a reaction spring 6.

The inputted driving signals give rise to a rectilinear displacement of the piezoelectric actuator 5, as shown by arrow A. Such a displacement is transmitted by way of a pin 7 to one end portion of the lever 4, which turns against a reaction force of the reaction spring 6, counterclockwise in the drawings. Together with the lever 4, the shaft 3 turns, transmitting the rotational displacement to the differential amplifier 2, where the turning is amplified and then transmitted to an output shaft 10. Then the mirror rotates predetermined degrees θ, deflecting a laser beam coming from a laser beam generator (not shown). For the differential speed increaser 2, a Harmonic Drive (a trade name) is usually used.

The free end portion of the piezoelectric actuator 5 abuts the pin 7, which engages with a notch 11 formed in the end portion of the lever 4, as shown in FIG. 4. The free end portion of the reaction spring 6 contacts the other end portion of the lever 4 through a piston 12. (Reference can be made to Japanese Laid-open Nos. 61-132919 and 61-134726.)

In the above driving apparatus, in which the pin 7 is stopped by the notch 11 formed in one end of the lever 4, when the lever 4 is rotated Δθ by the piezoelectric actuator 5, the supporting point of the lever 4 shifts with respect to the line of action of the piezoelectric actuator 5. Accordingly, there occur both shearing force $F_T$ to the piezoelectric actuator 5 and a relative movement between the pin 7 and the end surface of the piezoelectric actuator 5. Therefore, a force acting transversely onto the piezoelectric actuator 5 is generated, which may break the actuator 5. Also, the relative movement between the actuator 5 and the pin 7 causes loss due to a friction, affecting the precision in the positioning.

The present invention solves these problems by providing a laser scanner driving apparatus which: eliminates the force transverse to the line of action of the actuator during the operation of the actuator; eliminates the loss due to friction on the end surface of the actuator during the operation; therefore eliminates fear of breaking the actuator; and improves the positioning precision of a laser scanner driving apparatus.

SUMMARY OF THE INVENTION

A laser scanner driving apparatus according to the present invention, wherein a rectilinear displacement of a piezoelectric actuator rotates a lever against a reaction force of a reaction spring and then a displacement amplifier amplifies this rotational displacement to provide a large scanning angle, comprises rotatable contactors between the free end of the piezoelectric actuator and one contact portion of the lever, and between the reaction spring means and another contact portion of the lever.

When the actuator is displaced rectilinearly so that the lever is rotated, only rolling friction occurs between the free end of the actuator and the lever, and between the free end of the reaction spring means and the lever. Therefore, neither the actuator nor the reaction spring receives a force transverse to the line of action thereof, and thus the loss due to friction on the free end of the actuator can be substantially eliminated. As a result, the actuator will not break during its operation, and also the positioning precision of a laser scanner driving apparatus can be improved.

BRIEF DESCRIPTION OF THE DRAWINGS

FIG. 2 is a longitudinal sectional view thereof; FIG. 3 is a cross sectional view thereof; and FIG. 4 is an illustrative view of the essential portion thereof.

THE BEST MODE FOR CARRYING OUT THE INVENTION

Figure 1:
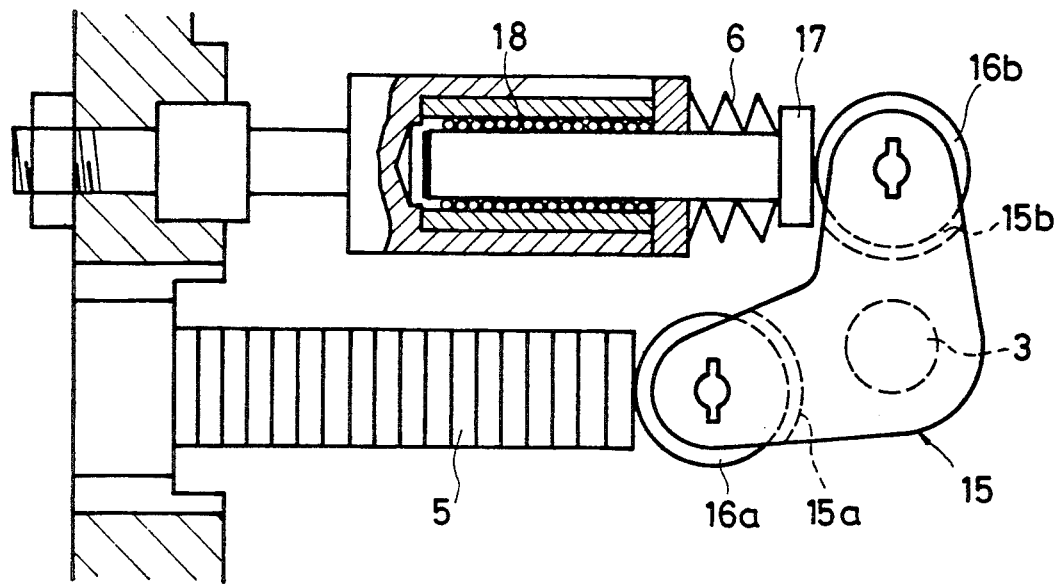
FIG. 1 is a partial cross sectional view of the essential portion of an embodiment of the present invention.
Figure 4:
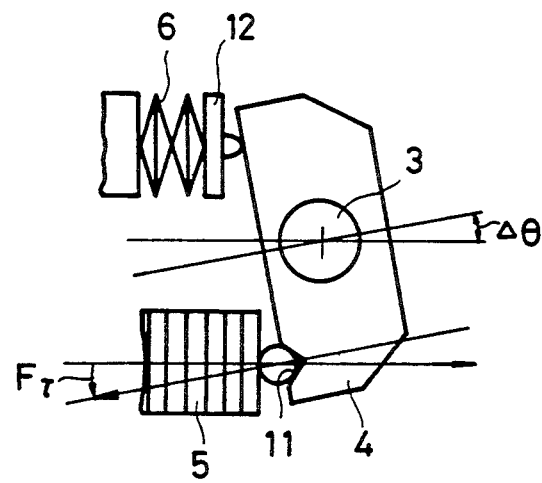
FIGS. 2 to 4 illustrate the conventional art.
Figure 2:
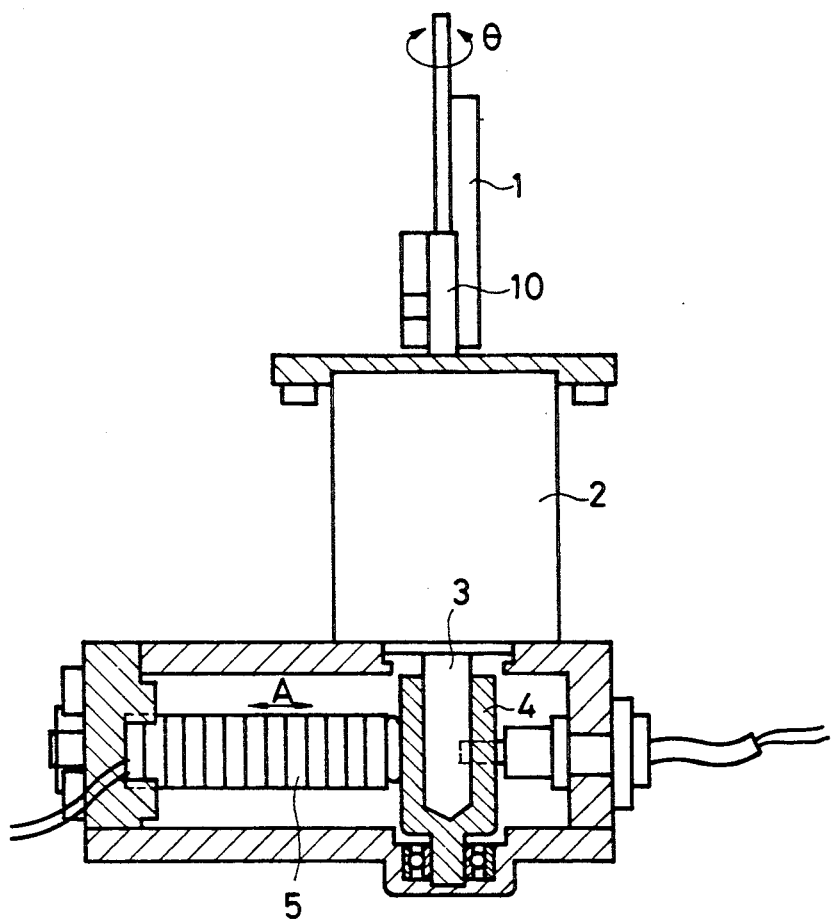
Figure 3:
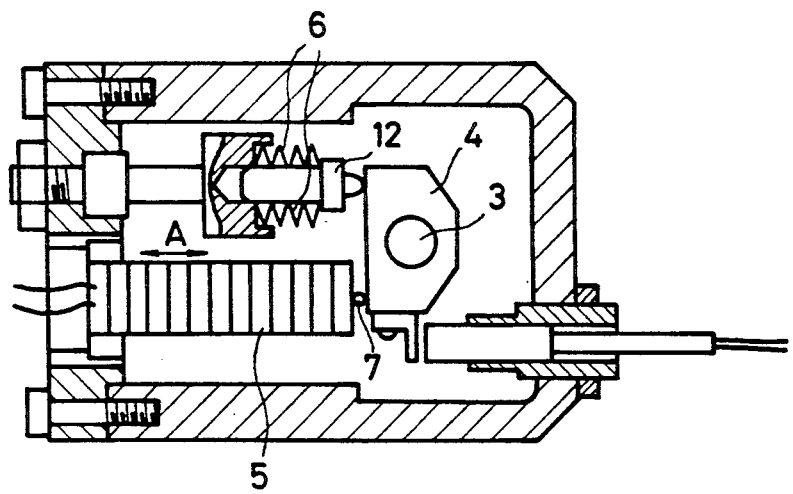

An embodiment of the present invention will be described with reference to FIG. 1. The parts of the embodiment corresponding to those of the conventional art shown in FIGS. 2, 3 are denoted by the same numbers, and the description thereof will be omitted. A bell-crank shaped lever 15 is fixed onto an input-side shaft 3 of a differential speed increaser 2. One arm 15a of the lever 15 rotatably supports a cam follower 16a which contacts the free end of a piezoelectric actuator 5, at its center portion when the actuator 5 is in the neutral state. The other arm 15b rotatably supports a cam follower 16b which contacts the central portion of the free end of a plunger 17 supported by a reaction spring 6. The plunger 17 slides along a guide bearing 18.

In this construction, when the actuator 5 is rectilinearly displaced according to inputted drive signals, the displacing force is transmitted by way of the contacting cam follower 16a to the arm 15a of the lever 15. The force rotates the lever 15 a predetermined angle against a reaction force of the reaction spring 6, which supports the other arm 15b.

Due to the turning of the lever 15, the contact points between the cam follower 16a of the lever 15 and the free end of the actuator 5, and between the cam follower 16b and the free end of the plunger 17 supported by the reaction spring 6 slightly shift transversely to the lines of action thereof. However, since the cam followers 16a, 16b rotate, there is no force acting transversely onto the contact portions. Also, only slight friction occurs at the contact portions since the friction thereat is rolling friction.

Rolling type bearing such as ball-bearing and roller-bearing may replace the cam followers 16a, 16b, giving the same effect.

As described above, the actuator 5 does not receive a force transverse to the line of action thereof during its operation, so that the loss due to friction on the free end of the actuator can be substantially eliminated. Consequently, breakage of the actuator during the operation is avoided, and also the positioning precision of a laser scanner driving apparatus can be improved.

INDUSTRIAL APPLICABILITY

The present invention, in which a rectilinear displacement of the piezoelectric actuator is very efficiently and precisely converted to a rotational displacement, provides a useful driving apparatus for a laser scanner with little loss due to friction and high positioning precision, particularly for a laser beam machine such as a microstep scanner system and a YAG laser marker.

I claim:

1. A laser scanner driving apparatus in which a rectilinear displacement of a piezoelectric actuator rotates a lever against a reaction force of a reaction spring and then a displacement amplifier amplifies this rotational displacement to provide a large scanning angle, comprising rotatable contactors between a free end of said piezoelectric actuator (5) and one contact portion of said lever (15), and between a free end of a plunger (17) supported by a reaction spring (6) and the other contact portion of said lever (15).

2. A laser scanner driving apparatus according to claim 1, wherein said contactors are cam followers (16a), (16b) or rolling type bearings.

3. A scanner driving apparatus comprising a piezoelectric actuator mounted so as to have a free end, a drive shaft, a lever mounted on the rive shaft for rotation therewith, the lever having a first portion and a second portion, at lest one rotatable contactor positioned between the free end of said piezoelectric actuator and the first portion of said lever, a plunger, at least one rotatable contactor positioned between one end of said plunger and the second portion of said lever, a reaction spring positioned so as to bias the plunger toward the second portion of the lever, whereby rectilinear displacement of the piezoelectric actuator causes the lever to rotate about the axis of the drive shaft against the reaction force of the reaction spring.

4. A scanner driving apparatus in accordance with claim 3 further comprising a displacement amplifier, which is driven by the drive shaft, to provide an amplified rotational displacement.

5. A scanner driving apparatus in accordance with claim 4 wherein said displacement amplifier has an output shaft, and further comprising a mirror positioned on said output shaft for rotation therewith.

6. A scanner driving apparatus in accordance with claim 5 wherein the at least one rotatable contactor positioned between the free end of said piezoelectric actuator and the first portion of the lever comprises a first cam follower rotatably mounted on the first portion of the lever and in rolling contact with the free end of the piezoelectric actuator.

7. A scanner driving apparatus in accordance with claim 6 wherein the first cam follower contacts the center portion of the free end of the piezoelectric actuator when the piezoelectric actuator is in the neutral state.

8. A scanner driving apparatus in accordance with claim 7 wherein the at lest one rotatable contactor positioned between said one end of the plunger and the second portion of the lever comprises a second cam follower rotatably mounted on the second portion of the lever and in rolling contact with said one end of the plunger.

9. A scanner driving apparatus in accordance with claim 8 wherein the second cam follower contacts the center portion of said one end of the plunger when the piezoelectric actuator is in the neutral state.

10. A scanner driving apparatus in accordance with claim 9 further comprising a sleeve surrounding the other end of the plunger, and guide bearings positioned between the interior of the sleeve and a portion of the plunger contained within the sleeve.

11. A scanner driving apparatus in accordance with claim 10 wherein said first and second portions of the lever are on opposite sides of the drive shaft.

12. A scanner driving apparatus in accordance with claim 11 wherein the lever is in the form of a bell-crank lever.

13. A scanner driving apparatus in accordance with claim 12 wherein each of the cam followers rotates about a respective axis which is parallel to the axis of the drive shaft.

14. A scanner driving apparatus in accordance with claim 3 wherein the at least one rotatable contactor positioned between the free end of the piezoelectric actuator and the first portion of the lever comprises a cam follower rotatably mounted on the first portion of the lever and in rolling contact with the free end of the piezoelectric actuator.

15. A scanner driving apparatus in accordance with claim 14 wherein the cam follower contacts the center portion of the free ed of the piezoelectric actuator when the piezoelectric actuator is in the neutral state.

16. A scanner driving apparatus in accordance with claim 3 wherein the at least one rotatable contactor positioned between said one end of the plunger and the second portion of the lever comprises a cam follower rotatably mounted on the second portion of the lever and in rolling contact with said one end of the plunger.

17. A scanner driving apparatus in accordance with claim 16 wherein the cam follower contacts the center portion of said one end of the plunger when the piezoelectric actuator is in the neutral state.

18. A scanner driving apparatus in accordance with claim 3 further comprising a sleeve surrounding the other end of the plunger, and guide bearings positioned between the interior of the sleeve and a portion of the plunger contained within the sleeve to facilitate the sliding action of the plunger.

19. A scanner driving apparatus in accordance with claim 3 wherein said first and second portions of the lever are on opposite sides of the drive shaft.

20. A scanner driving apparatus in accordance with claim 3 wherein the lever is in the form of a bell-crank lever.

* * * * *